United States Patent
Lee et al.

(10) Patent No.: US 9,374,208 B2
(45) Date of Patent: Jun. 21, 2016

(54) METHOD FOR CHANNEL ALLOCATING IN WIRELESS ACCESS SYSTEM

(75) Inventors: Moon Il Lee, Gyeonggi-do (KR); So Yeon Kim, Gyeonggi-do (KR); Jae Hoon Chung, Gyeonggi-do (KR); Hyun Soo Ko, Gyeonggi-do (KR); Seung Hee Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 12/922,595

(22) PCT Filed: Mar. 16, 2009

(86) PCT No.: PCT/KR2009/001286
§ 371 (c)(1),
(2), (4) Date: Sep. 14, 2010

(87) PCT Pub. No.: WO2009/113836
PCT Pub. Date: Sep. 17, 2009

(65) Prior Publication Data
US 2011/0013581 A1    Jan. 20, 2011

Related U.S. Application Data

(60) Provisional application No. 61/036,474, filed on Mar. 14, 2008, provisional application No. 61/084,992, filed on Jul. 30, 2008.

(30) Foreign Application Priority Data

Oct. 10, 2008    (KR) .................. 10-2008-0099671

(51) Int. Cl.
*H04W 72/04*    (2009.01)
*H04W 72/14*    (2009.01)
(Continued)

(52) U.S. Cl.
CPC ............ *H04L 5/0048* (2013.01); *H04L 5/0007* (2013.01); *H04L 5/0023* (2013.01); *H04L 25/03343* (2013.01)

(58) Field of Classification Search
CPC ................... H04W 72/1273; H04W 72/0453; H04W 72/042; H04L 1/1854
See application file for complete search history.

(56) References Cited

U.S. PATENT DOCUMENTS 5,936,967 A    8/1999    Baldwin et al.
7,940,795 B2    5/2011    Frederiksen et al.
(Continued)

FOREIGN PATENT DOCUMENTS

CN    1409562 A    4/2003
JP    2005-354537 A    12/2005
(Continued)

OTHER PUBLICATIONS

Motorola, "UL ACK/NACK for TDD", 3GPP TSG RAN1#52, R1-080738 (Feb. 11-15, 2008).
(Continued)

*Primary Examiner* — Asad Nawaz
*Assistant Examiner* — Jason Harley
(74) *Attorney, Agent, or Firm* — Morgan, Lewis & Bockius LLP

(57) ABSTRACT

A method for allocating uplink and downlink physical channels to improve throughput of a wireless access system is disclosed. A method for allocating channels to optimize a wireless access system which supports radio frequencies comprises configuring one or more physical channels in a transmitter; allocating first physical channels to a receiver considering features of the one or more physical channels; and transmitting one or more control channels to the receiver through a predetermined physical channel of the first physical channels, the control channels including configuration information of the first physical channels allocated to the receiver.

12 Claims, 11 Drawing Sheets

(51) Int. Cl.
  *H04L 27/26* (2006.01)
  *H04L 5/00* (2006.01)
  *H04L 25/03* (2006.01)

(56) References Cited

U.S. PATENT DOCUMENTS

| | | | |
|---|---|---|---|
| 2003/0063620 A1 | 4/2003 | You et al. | |
| 2003/0117980 A1 | 6/2003 | Kim et al. | |
| 2004/0028011 A1* | 2/2004 | Gehring et al. | 370/330 |
| 2004/0196793 A1 | 10/2004 | Lucidarme et al. | |
| 2005/0003768 A1* | 1/2005 | Laroia et al. | 455/101 |
| 2005/0227628 A1* | 10/2005 | Inanoglu | 455/68 |
| 2006/0009230 A1 | 1/2006 | Fukumoto et al. | |
| 2006/0153155 A1* | 7/2006 | Jacobsen | H04L 1/1829 370/338 |
| 2006/0281465 A1 | 12/2006 | McBeath et al. | |
| 2007/0264994 A1 | 11/2007 | Schwarz et al. | |
| 2008/0075060 A1 | 3/2008 | Tiirola et al. | |
| 2008/0080423 A1 | 4/2008 | Kolding et al. | |
| 2008/0095106 A1 | 4/2008 | Malladi et al. | |
| 2008/0095110 A1 | 4/2008 | Montojo et al. | |
| 2008/0117891 A1 | 5/2008 | Damnjanovic et al. | |
| 2008/0159323 A1* | 7/2008 | Rinne | H04L 1/0004 370/431 |
| 2008/0207150 A1* | 8/2008 | Malladi et al. | 455/127.1 |
| 2008/0273479 A1 | 11/2008 | Kwak et al. | |
| 2008/0298450 A1* | 12/2008 | Zhang et al. | 375/227 |
| 2008/0316959 A1* | 12/2008 | Bachl et al. | 370/329 |
| 2008/0320354 A1* | 12/2008 | Doppler | H04L 1/04 714/748 |
| 2009/0046637 A1* | 2/2009 | Kim et al. | 370/329 |
| 2009/0103562 A1 | 4/2009 | Frederiksen et al. | |
| 2009/0129259 A1 | 5/2009 | Malladi et al. | |
| 2009/0257533 A1 | 10/2009 | Lindoff et al. | |
| 2009/0268693 A1 | 10/2009 | Lindh et al. | |
| 2009/0300456 A1 | 12/2009 | Pelletier et al. | |
| 2010/0002647 A1* | 1/2010 | Ahn et al. | 370/329 |
| 2010/0008317 A1 | 1/2010 | Bhattad et al. | |
| 2010/0088580 A1 | 4/2010 | Chun et al. | |
| 2010/0128687 A1* | 5/2010 | Oteri | H04L 1/1887 370/329 |
| 2010/0135173 A1 | 6/2010 | Tynderfeldt et al. | |
| 2010/0144282 A1* | 6/2010 | Laroia et al. | 455/63.3 |
| 2010/0232373 A1 | 9/2010 | Nory et al. | |
| 2010/0234037 A1 | 9/2010 | Terry et al. | |
| 2010/0317360 A1 | 12/2010 | McBeath et al. | |
| 2011/0059767 A1 | 3/2011 | Parkvall et al. | |
| 2011/0081856 A1 | 4/2011 | Johansson et al. | |

FOREIGN PATENT DOCUMENTS

| | | |
|---|---|---|
| JP | 2010-527823 A | 8/2010 |
| JP | 2011-525750 A | 9/2011 |
| JP | 2012-520633 A | 9/2012 |
| KR | 2003-0068014 | 8/2003 |
| KR | 10-2004-063059 A | 7/2004 |
| KR | 10-2006-0092400 A | 8/2006 |
| KR | 10-2007-0103717 A | 10/2007 |
| WO | WO 2005/069505 | 7/2005 |
| WO | 2006/046307 A1 | 4/2006 |
| WO | 2006/124204 A1 | 11/2006 |
| WO | 2008/014275 A2 | 1/2008 |
| WO | WO2008057843 A2 | 5/2008 |
| WO | 2008/084985 A2 | 7/2008 |
| WO | 2008/147037 A1 | 12/2008 |

OTHER PUBLICATIONS

LG Electronics, "Considerations on DL/UL Transmission in Asymmetric Carrier Aggregation," 3GPP TSG RAN WG1 Meeting #55, R1-084197 (Nov. 10-14, 2008).
LG Electronics, "Uplink Control Channel Transmission for LTE-Advanced," 3GPP TSG RAN WG1 #56, R1-090656 (Feb. 9-13, 2009).
NTT DoCoMo, Inc., "UL Layered Control Signal Structure in LTE-Advanced," 3GPP TSG RAN WG1 Meeting #54, R1-083679 (Sep. 29-Oct. 3, 2008.
NTT DoCoMo, Inc., Proposals for LTE-Advanced Technologies, R1-082575, 3GPP, Jul. 4, 2008.
Texas Instruments, Enhancements for LTE-Advanced, R-081979, 3GPP, May 9, 2008.
3 GPP TSG RAN WG1 Meeting #53 bis R1-082468, "Carrier aggregation in LTE-Advanced," Ericsson, Jul. 4, 2008.
Office Action from the U.S. PTO dated Mar. 4, 2013 in technologically related U.S. Appl. No. 13/056,460.
3rd Generation Partnershp Project; Technical Specification Grop adio Access netowrk; Evolved Universal Terrestrial Radio Access (E-UTRA); Physical layer procedures (Release 8); 3GPP TS 36.213 V8.1.0 (Nov. 2011), pp. 1-17.
3rd Generation Partnership Project; Technical Specification Group Radio Access Network; Evolved Universal Terrestrial Radio Access (E-UTRA); Multiplexing and channel coding (Release 8); 3GPP TS 36.212 V8.1.0 (Nov. 2007), pp. 1-39.
Office Action from the U.S. PTO dated Feb. 1, 2013 in related technology U.S. Appl. No. 13/056,223.
PDCCH Search Space Assignment and Signaling, 3GPP RAN1 #52, Sorrento, Italy, Feb. 11-15, 2008, pp. 1-3.
Configuration of PDVVH candidate sets for the control of bind decoding attempts, 3GPP TSG RAN WG1 Meeting #52, Sorrento, Italy, Feb. 11-15, 2008, pp. 1-5.
NTT DoCoMo, Multiplexing Schemes for UL Control Signals in E-UTRA, 3GPP TSG RAN WG1 Meeting #51, Jeju, Korea, Nov. 5-9, 2007, R1-074813, pp. 1-3.
Office Action dated Jan. 16, 2014, issued by the U.S. Patent & Trademark Office in U.S. Appl. No. 13/056,223.
Office Action dated Jan. 16, 2014, issued by the U.S. Patent & Trademark Office in U.S. Appl. No. 13/056,460.
Office Action dated Jul. 1, 2014, issued by the U.S. Patent and Trademark Office in U.S. Appl. No. 13/056,223.
Office Action dated Feb. 21, 2014, issued by the Japanese Patent Office in Japanese Patent Application No. 2012-189838.
"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," 3GPP Standard; 3GPP TR 25.912, V7.2.0, XP050369335, Jun. 2007.
"3rd Generation Partnership Project; Technical Specification Group Radio Access network; Evolved Universal Terrestrial Radio Access (E-UTRA); Physical layer procedures (Release 8)," 3GPP Standard; 3GPP TS 36.213, V8.2.0, XP050377557, Mar. 2008.
Motorola: "PHICH Assignment for TDD and FDD E-UTRA," 3GPP TSG RAN1 #52, R1-080734—PHICH Assignment FDD-TDD, 3rd Generation Partnership Project (3GPP), vol. RAN WG1, XP050109224, Feb. 2008.
Ericsson: "LTE Resource aggregation," 3GPP TSG-RAN WG4 (rADIO) Meeting #38, R4-060066, 3rd Generation Partnership Project (3GPP), Mobile Competence Centre; vol. RAN WG4, XP050175140, Feb. 2006.
LG Electronics: "Proposals and issues on the carrier aggregation and control signaling for LTE-A," 3GPP TSG RAN WG1 #55, R1-084194 LTE A_Carrier Aggregation, XP050317483, Nov. 2008.
LG Electronics: "PDCCH structure for multiple component carriers," 3GPP TSG RAN WG1 #56, R1-091065 LTE0A PDCCH Structure, XP050318878, Feb. 2009.
Texas Instruments: "Issues on Carrier Aggregation for Advanced E-UTRA," 3GPP TSG RAN WG1 #55, R1-084443, XP050317701, Nov. 2008.
Nokia et al.: "L1 control signaling with carrier aggregation in LTE-Advanced," 3GPP TSG-RAN WG1 Meeting #54bis, R1-083730, XP050317069, Sep. 2008.
European Search Report dated Jun. 23, 2014, issued by the European Patent Office in European Patent Application No. 09719705.7.
European Search Report dated Jun. 23, 2014, issued by the European Patent Office in European Patent Application No. 09803164.4.
Ericsson: "Blind PDCCH decoding," 3GPP TSG-RAN Meeting #53, R1-082229, 3rd Generation Partnership Project (3GPP), XP050110524, May 2008.

(56) References Cited

OTHER PUBLICATIONS

Qualcomm Europe: "Details on PDCCH for DL data arrival," 3GPP TSG-RAN WG1 #53, R1-081978 PDCCH for DL Data Arrival, 3rd Generation Partnership Project (3GPP), XP050110327, May 2008.
LG Electronics: "Component carrier indication by PDCCH for multiple carrier aggregation in LTE-Advanced," 3GPP TSG-RAN WG1 #57 bis, R1-092500 CC Indication in PDCCH, 3rd Generation Partnership Project (3GPP), XP050351007, Jun. 2009.
ITRI: "Carrier Identification in PDCCH," 3GPP TSG RAN WG1 Meeting #57 bis, R1-092683_Carrier_Indication_in_PDCCH, 3rd Generation Partnership Proejct (3GPP), XP050351161, Jun. 2009.
Alcatel-Lucent, "Component carrier indication for bandwidth extension in LTE-A," 3GPP TSG-RAN WG1 #57bis R1-092330, Jul. 3, 2009.
Office Action dated Feb. 24, 2014, issued by the U.S. Patent & Trademark Office in U.S. Appl. No. 13/056,451.
USPTO Office Action dated Jun. 10, 2012 in related technology of U.S. Appl. No. 13/056,451.
3GPP TS 36.213 V8.2.0 (Mar. 2008); 3rd Generation Partnership Project; Technical Specification Group Radio Access Network; Evolved Universal Terrestrial Radio Access (E-UTRA); Physical layer procedures (Release 8).
3GPP TS 36.321 V8.2.0 (May 2008), 3rd Generation Partnership Project; Technical Specification Group Radio Access Network; Evolved Universal Terrestrial Radio Access (E-UTRA); Medium Access Control (MAC) protocol specification (Release 8).
Japanese Office Action, dated Aug. 14, 2013.
Office Action dated Jun. 4, 2014, issued by the U.S. Patent and Trademark Office in U.S. Appl. No. 13/056,451.
3GPP TSG-RAN WG2 #51 (Feb. 13-17, 2006); LG Electronics, Inc., Cell/UE Bandwidth Scenarios for LTE, Proposal and Decision; R2-060578.
3GPP TSG RAN1#50 (Aug. 20-24, 2007); Motorola, UE Capability, Discussion; R1-073365.
3GPP TSG RAN WG1 Meeting #51bis (Jan. 14-18, 2008); Samsung, Configuration of PDCCH Monitoring Set, Discussion and Decision; R1-080028.
Japanese Office Action, dated Jul. 22, 2013.

3GPP TS 36.213 V8.3.0 (May 2008); 3rd Generation Partnership Project; Technical Specification Group Radio Access Network; Evolved Universal Terrestrial Radio Access (E-Utra); Physical layer procedures (Release 8).
3GPP Ts 36.313 V8.2.0 (May 2008); 3rd Generation Partnership Project; Technical Specification Group Radio Access Network; Evolved Universal Terrestrial Radio Access (E-UTRA); Radio Resource Control (RRD); Protocol specification (Release 8).
LTEPTCLOVWWP, White Paper, "Long Term Evolution Protocol Overview," Rev. 0, Oct. 2008, Freescale Semiconductor.
LTE Quick Reference for CFI (Control Format Indicator) from Sharenote.com Handbook on Sep. 17, 2013.
U.S. Office Action in U.S. Appl. No. 13/056,460, dated Sep. 25, 2013.
Office Action dated Sep. 18, 2014, issued by the U.S. Patent & Trademark Office in U.S. Appl. No. 13/056,451.
Office Action dated Jan. 26, 2015, issued by the U.S. Patent & Trademark Office in U.S. Appl. No. 13/056,451.
European Search Report dated Jul. 18, 2014, issued by the European Patent Office in European Patent Application No. 09803166.
LG Electronics: "Randomization Function for PDCCH search space," 3GPP TSG RAN WG1#52bis, R1-081567, PDCCH Sesarch Space Randomization (Revised), XP050109982, 2008.
"3rd Generation Partnership Project; Technical Specification Group Radio Access Network; Evolved Universal Terrestrial Radio Access (E-UTRA); Physical layer procedures (Release 8)," 3GPP TS 36.213 v8.3.0, XP050377558, May 2008.
Motorola: "Search Space Definition: Reduced PDCCH Blind Detection for Split PDCCH Search Space," 3GPP TSG RAN1#51, R1-074583, XP050108074, 2007.
Samsung: "UE-specific search space," 3GPP TSG RAN WG1 Meeting #52bis, R1-081212, XP050109656, 2008.
LG Electronics: "PDCCH structure for multiple carrier aggregation in LTE-Advanced," 3GPP TSG RAN WG1 #57, R1-092237, XP050339657, May 2009.
Nortel Networks: "Control Channel Design for the Support of Wider Bandwidth for LTE-Advanced," 3GPP TSG-RAN1 #55bis, R1-090157, XP050597201, Jan. 2009.
Search Report dated May 28, 2015, issued by the European Patent Office in European Patent Application No. 09803168.5.
Motorola, "E-UTRA Uplink Control Channel Design and TP," XP002474357, R1-060403, 3GPP TSG RAN1#44, Feb. 13, 2006.

* cited by examiner (a)

(b)

METHOD FOR CHANNEL ALLOCATING IN WIRELESS ACCESS SYSTEM

RELATED APPLICATIONS

The present application is a U.S. National Phase Application of International Application No. PCT/KR2009/001286 (filed Mar. 16, 2009) which claims priority to U.S. Provisional Application Nos. 61/036,474 (filed Mar. 14, 2008), 61/084,992 (filed Jul. 30, 2008), and Korean Application No. 10-2008-0099671 (filed Oct. 10, 2008).

TECHNICAL FIELD

The present invention relates to a wireless access system that supports multi-radio frequencies, and more particularly to, a method for allocating uplink and downlink physical channels to improve throughput of a wireless access system.

BACKGROUND ART

Hereinafter, a structure of a general wireless access system and a method for allocating a wireless channel will be described in brief.

FIG. 1 is a concept diagram illustrating a communication system that uses one or more radio frequencies (RF).

Referring to FIG. 1, a communication system that supports radio frequencies can use a total of N RFs. A base station (BS) can simultaneously transmit data to one mobile station using one or more RFs. The mobile station can also transmit data to the base station using one or more RFs. At this time, one RF can be configured as one or a plurality of physical channels, and the base station and the mobile station can include a plurality of transmitting antennas (Tx). This system can be referred to as a multi-carrier system.

FIG. 2 is a diagram illustrating structures of a transmitter and a receiver, which use multi-radio frequencies.

Referring to FIG. 2, a logical concept of the physical channel can be identified by an uplink channel and a downlink channel. In FIG. 2, N number of radio frequencies (RF 1, RF 2, . . . , RF N) are provided, and M number of physical channels (PHY 1, PHY 2, . . . , PHY M) are provided.

Signals generated through N number of RFs in the transmitter can be transmitted to the receiver through M number of physical channels. At this time, N number of signals can be scheduled in such a manner that the signals are simultaneously transmitted through an RF multiplexer. The signals multiplexed through the RF multiplexer in the transmitter are transmitted to the receiver through Nt number of physical transmitting antennas (Tx).

The signals transmitted as above can be received through Nr number of receiving antennas (Rx) of the receiver that supports reception of multi-RFs. The signals received in Nr number of receiving antennas are split into M number of PHY channels through a multiple RF Demultiplexer. The receiver can recover the signals transmitted from the transmitter through each PHY channel.

All schemes used in the system that uses the existing single RF can be used in each physical channel of the multiple RF transmitter and receiver. In configuring the system of FIG. 2, a plurality of RF communication modules may be configured, or a plurality of physical channels can sequentially be generated and recovered using one RF module.

DISCLOSURE

Technical Problems

In the general multi-RF system, a problem occurs in that the communication system is not optimized as a multi-antenna scheme is used without considering frequency channel feature for each physical channel or a control channel is not designed.

Accordingly, the present invention is directed to a method for allocating channels in a wireless access system, which substantially obviates one or more problems due to limitations and disadvantages of the related art.

An object of the present invention is to provide a method for improving throughput of a wireless access system.

Another object of the present invention is to provide a method for optimally transmitting and receiving data between an uplink and a downlink to improve throughput of a communication system that supports multi-RFs.

Still another object of the present invention is to provide an optimized communication system by using a multi-antenna scheme considering a frequency channel feature for each physical channel or designing a control channel.

Further still another object of the present invention is to provide a transmitting and receiving scheme optimized for each physical channel and a system parameter optimized for each physical channel.

Further still another object of the present invention is to provide compatibility between the existing system and a system suggested in the embodiments of the present invention through proper modification of a control channel when a physical channel having technical spirits of the present invention has the same frame structure as that of the existing specific system of the related art.

Technical Solutions

In order to solve the above technical problems, the present invention discloses a method for allocating uplink and downlink physical channels to improve throughput of a wireless access system.

In one aspect of the present invention, a method for allocating channels to optimize a wireless access system which supports radio frequencies comprises configuring one or more physical channels in a transmitter; allocating first physical channels to a receiver considering features of the one or more physical channels; and transmitting one or more control channels to the receiver through a predetermined physical channel of the first physical channels, the control channels including configuration information of the first physical channels allocated to the receiver.

The step of allocating first physical channels includes determining a multiplexing mode for multiplexing the first physical channels in accordance with the features of the first physical channels. In this case, the first physical channels are multiplexed using at least one of a TDD mode or an FDD mode. Also, the step of determining a multiplexing mode, the transmitter determines the multiplexing mode considering features of service traffic transmitted through the first physical channels.

The step of allocating first physical channels further includes determining a number of maximum ranks to which each of the first physical channels is transmitted in accordance with the features of the first physical channels.

The step of allocating first physical channels further includes selecting a code word for precoding the first physical channels in accordance with the features of each of the first physical channels.

The step of allocating first physical channels includes determining a number of transmitting antennas through which the first physical channels are transmitted in accordance with the features of the first physical channels.

The step of allocating first physical channels further includes selecting reference signal allocation structures used in the first physical channels in accordance with the features of the first physical channels. In this case, the reference signals used in the first physical channels are allocated differently from one another in accordance with the features of the first physical channels.

The step of allocating first physical channels includes determining a number of the first physical channels allocated to the receiver in accordance with level of the receiver.

The one or more control channels are one or more downlink control channels or one or more uplink control channels for allocating the first physical channels to the receiver.

The one or more control channels are coded using at least one of joint coding and separate coding, and are centralized in a multi-control channel. At this time, the transmitter can perform cyclic redundancy check (CRC) masking for each of the control channels. Also, the transmitter can perform CRC masking for the multi-control channel. Moreover, the transmitter can perform CRC masking for the multi-control channel after performing CRC masking for each of the control channels.

Furthermore, the one or more control channels are transmitted to the receiver through only a specific physical channel among the first physical channels. At this time, the specific physical channel is a physical channel of the lowest frequency band, among the first physical channels.

Furthermore, the one or more control channels are separated through one or more physical channels and then transmitted to the receiver.

The step of transmitting the one or more control channels further includes transmitting a control channel map to the receiver, the control channel map including position information of a place to which the one or more control channels are transmitted. At this time, the control channel map is transmitted through one or more physical channels of the first physical channels using a predetermined hopping pattern.

The method further comprises feeding channel status information of the first physical channels back from the receiver through one or more uplink control channels allocated through the one or more control channels. At this time, the step of feeding channel status information includes simultaneously feeding the channel status information back from the receiver through the one or more uplink control channels, or feeding the channel status information back from the receiver at a multiple period for each of the one or more uplink control channels.

In another aspect of the present invention, a method for allocating channels to optimize a wireless access system which supports radio frequencies comprises receiving one or more control channels including configuration information of first physical channels; receiving the first physical channels using the configuration information; and feeding channel status information of the first physical channels back to a receiver.

Advantageous Effects

According to the embodiments of the present invention, the following effects can be obtained.

First of all, as the embodiments of the present invention are used, throughput of the wireless access system can be improved. Accordingly, an optimized transmitting and receiving scheme can be used in an uplink and a downlink of a communication system that supports multi-RFs.

Second, as a multi-antenna scheme is used considering a frequency channel feature for each physical channel, an optimized communication system can be obtained.

Finally, data can efficiently be transmitted and received through compatibility between a communication system having technical spirits of the present invention and the existing system.

BEST MODE FOR CARRYING OUT THE INVENTION

Figure 1:
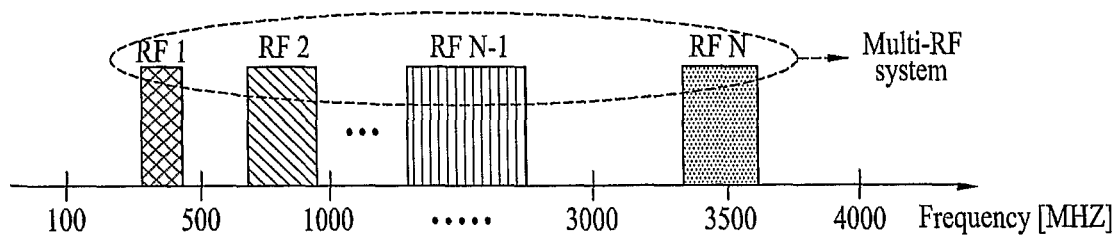
FIG. 1 is a concept diagram illustrating a communication system that uses one or more RFs.
Figure 2:
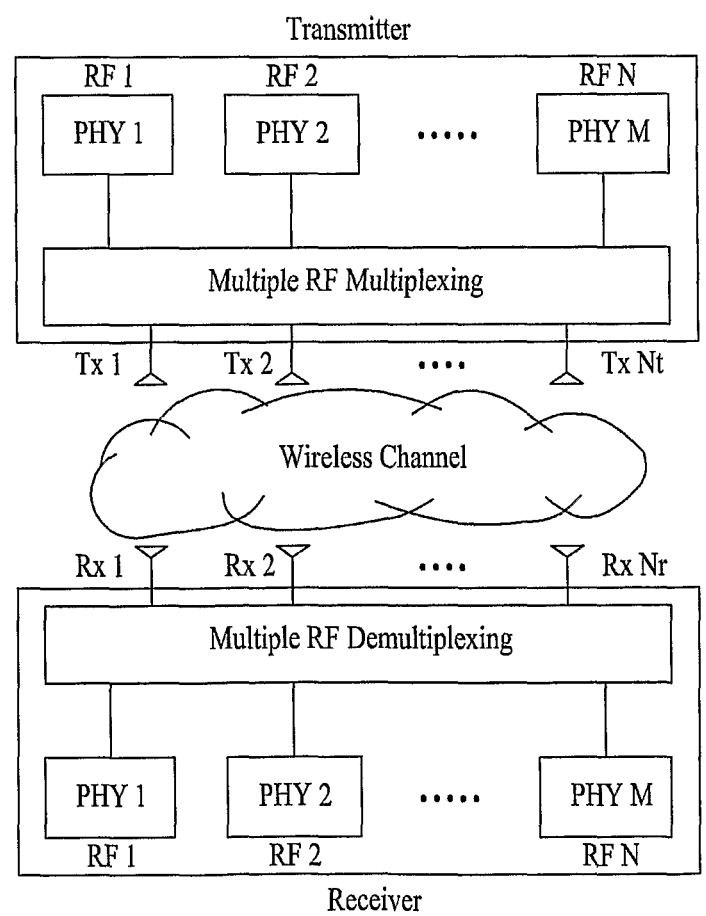
FIG. 2 is a diagram illustrating structures of a transmitter and a receiver, which use multi-radio frequencies.

To solve the aforementioned technical problems, the present invention discloses methods for allocating uplink and downlink physical channels to improve throughput of a wireless access system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment and a mobile subscriber station.

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Particularly, the embodiments of the present invention can be supported by standard documents, i.e., 3GPP TS 36.211, 3GPP TS 36.212, and 3GPP TS 36.213.

Namely, among the embodiments of the present invention, steps or parts which are not described to clarify technical spirits of the present invention can be supported by the above standard documents. Also, all terminologies disclosed herein can be described by the above standard documents.

Specific terminologies hereinafter described are provided to assist understanding of the present invention, and various modifications can be made in the specific terminologies within the range that they do not depart from technical spirits of the present invention.

Hereinafter, physical channels to which the embodiments of the present invention can be applied will be described.

Figure 3:
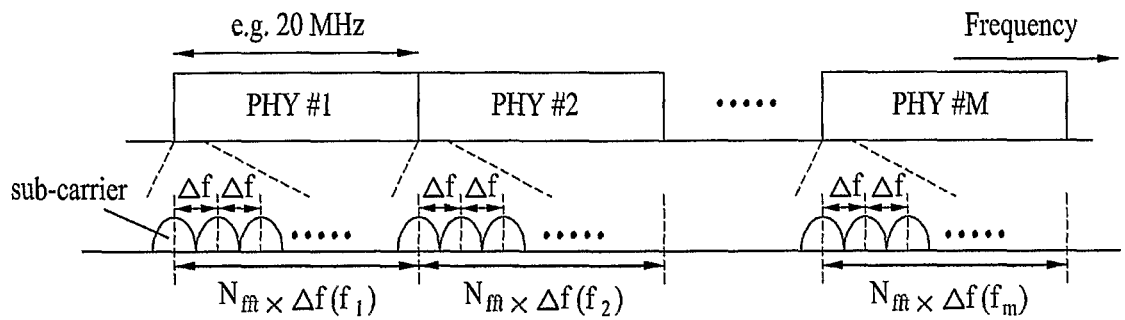
FIG. 3 and FIG. 4 are diagrams illustrating physical channels and sub-carriers configuring the physical channels.
Figure 4:
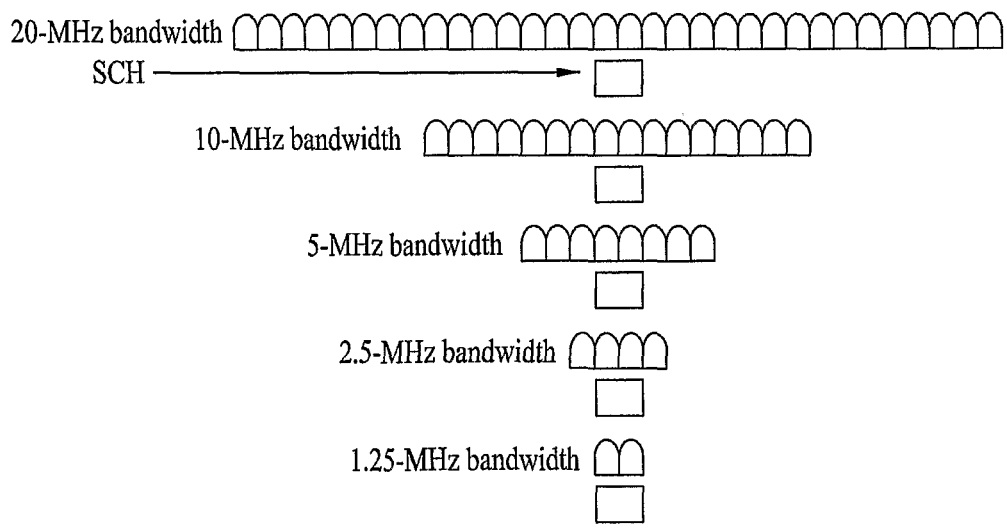

FIG. 3 and FIG. 4 are diagrams illustrating physical channels and sub-carriers configuring the physical channels.

Referring to FIG. 3, one physical channel can have a size of 20 Mhz, approximately. Each of M number of physical channels has a bandwidth of $N_{fi}*\Delta f$, wherein $\Delta f$ represents a frequency unit of sub-carriers. Also, each physical channel can have a center frequency of fi (i=1, 2, ..., M). At this time, the center frequencies can be spaced apart from one another at regular intervals or irregular intervals. Moreover, each physical channel can use a bandwidth smaller than a maximum bandwidth depending on a cell or a mobile station or a base station.

Furthermore, a synchronization channel (SCH) for cell search can exist in all bandwidths. This SCH is located in all physical channels so that all mobile stations are synchronized. If a system is configured as illustrated in FIG. 3 and FIG. 4, the mobile station or the base station can transmit and receive data using one or more physical channels.

The number of physical channels of the mobile station may be different from that of the base station. For example, it is preferable that M number of physical channels can be used in the base station while L number of physical channels can be used in the mobile station. At this time, the number of L may be smaller than or equal to M. Generally, the number of L may be varied depending on a type of the mobile station.

Figure 5:
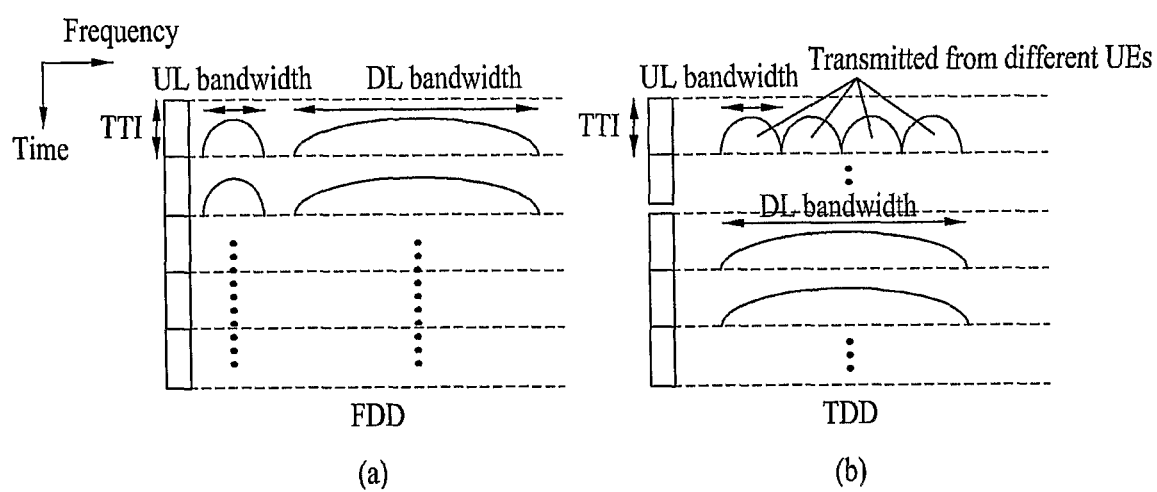
FIG. 5 is a diagram illustrating examples of structures of an uplink and a downlink used in a communication system that supports multi-RFs.

FIG. 5 is a diagram illustrating examples of structures of an uplink and a downlink used in a communication system that supports multi-RFs.

In the system having a plurality of RFs, structures of an uplink (UL) and a downlink (DL) can be designed in various types. For example, the UL and the DL can be designed so that their bandwidths are equal to each other in a frequency division duplexing (FDD) system. Namely, if M number of physical channels are equally configured in each of the UL/DL, a symmetric structure of FDD can be obtained.

Alternatively, the number of physical channels constituting the UL may be different from that constituting the DL. In this case, an asymmetric structure is obtained so that a specific link has higher data throughput. FIG. 5($a$) illustrates an asymmetric structure for an FDD mode while FIG. 5($b$) illustrates an asymmetric structure for a time division duplexing (TDD) mode.

Figure 6:
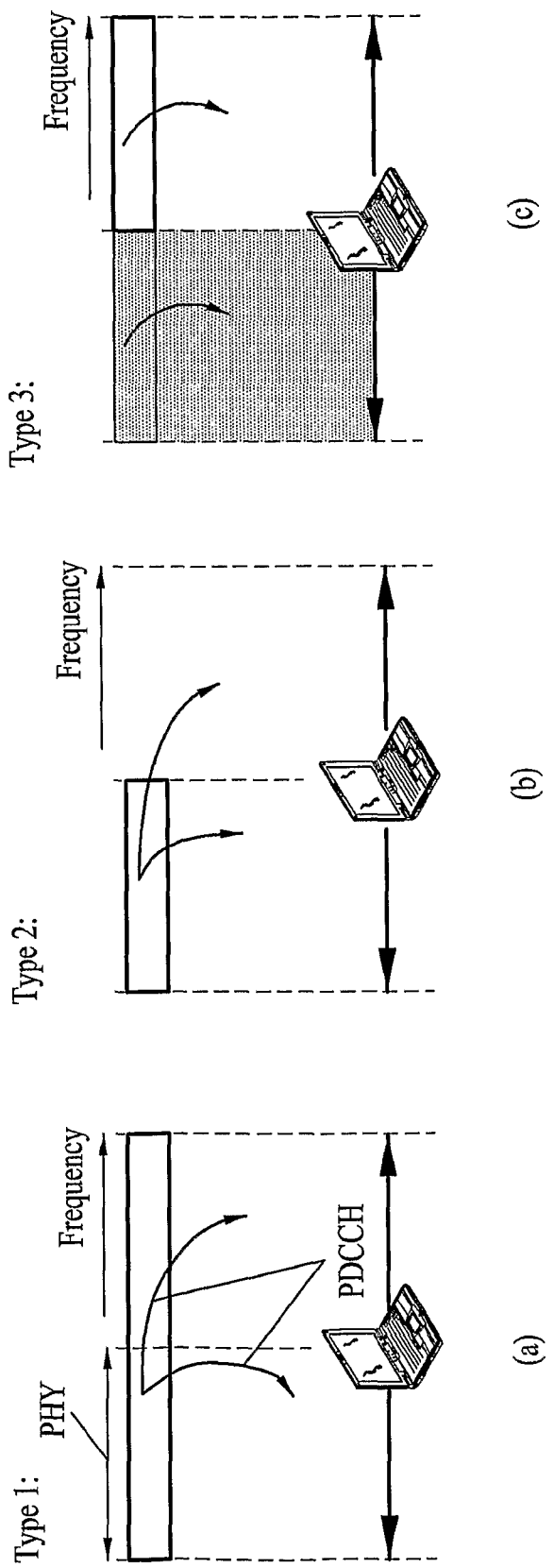
FIG. 6 is a diagram illustrating a method for allocating a downlink control channel in a system having an asymmetrical structure.

FIG. 6 is a diagram illustrating a method for allocating a downlink control channel in a system having an asymmetrical structure.

Referring to FIG. 6, if one mobile station uses several physical channels, a method for allocating a physical downlink control channel (PDCCH) can be identified.

FIG. 6($a$) illustrates a first type of methods for allocating a downlink control channel to a mobile station. The base station can transmit a PDCCH to the mobile station using PDCCH regions of several physical channels, wherein the PDCCH includes information of downlink data transmission. In case of the first type, since control information of the downlink is transmitted by being separated into several physical channels, the PDCCH can obtain diversity gain. However, if a channel status of a specific physical channel is not good, a problem may occur in that the mobile station cannot receive data.

FIG. 6($b$) illustrates a second type of methods for allocating a downlink control channel to a mobile station. Namely, if the base station allocates several downlink physical channels, the base station transmits PDCCH information to only a specific physical channel. In case of the second type, it is advantageous in that minimum downlink control information is required. However, a channel status of a specific physical channel is not good, a problem may occur in that the mobile station cannot receive data existing in other physical channels.

FIG. 6(c) illustrates a third type of methods for allocating a downlink control channel to a mobile station. Namely, if L number of physical channels are allocated to the mobile station, the mobile station receives data using L number of PDCCHs, wherein an independent PDCCH is used for each of physical channels. In case of the third type, since an independent PDCCH is allocated to each physical channel, it is advantageous in that flexibility is the highest and data transmission of other physical channels can be performed even though a channel status of a specific physical channel is not good. Accordingly, the third type has a feature robust to channel status. However, since control information repeatedly transmitted may be included in each physical channel, unnecessary overhead may occur.

Figure 7:
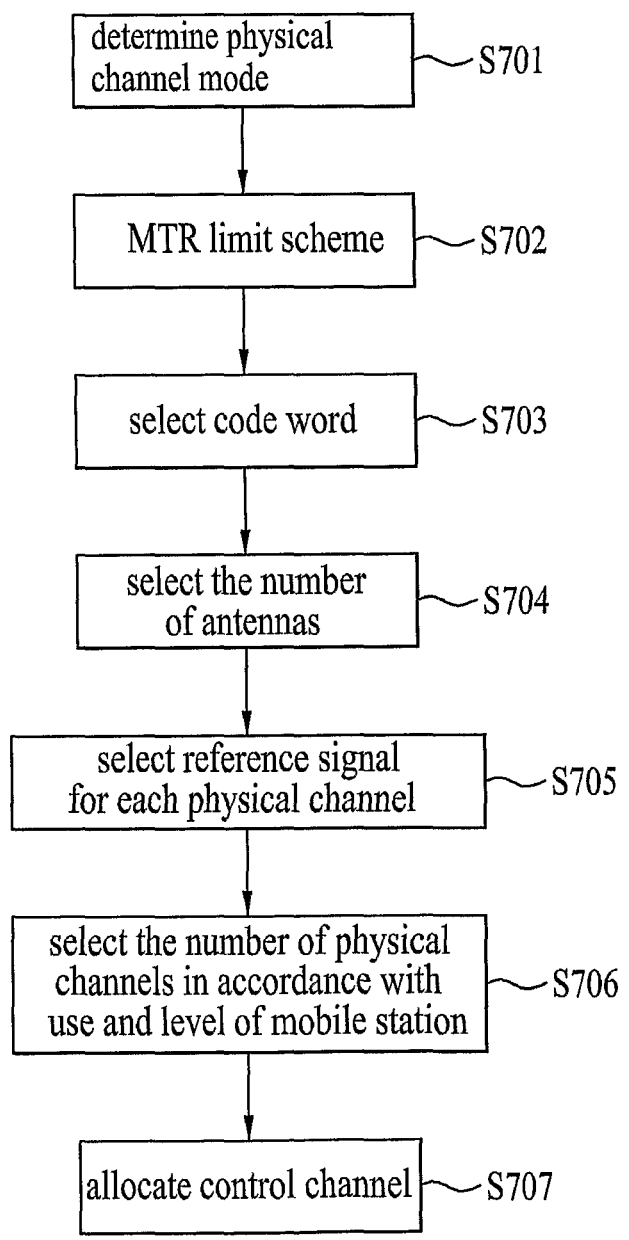
FIG. 7 is a diagram illustrating an optimized method for each frequency band of physical channels in accordance with one embodiment of the present invention.

FIG. 7 is a diagram illustrating an optimized method for each frequency band of physical channels in accordance with one embodiment of the present invention.

Referring to FIG. 7, the base station can select a duplexing mode used in accordance with a frequency band of a physical channel to optimize the system. For example, the base station can selectively use an FDD mode or a TDD mode in accordance with features of a physical channel, or can use the FDD mode and the TDD mode together (S701).

Also, the base station can determine the number of ranks transmitted from each antenna in accordance with a physical channel after selecting the duplexing mode of the physical channel. As a method of determining ranks for each physical channel, there is provided a method of limiting maximum transmission ranks. According to the method of limiting MTRs, each physical channel can have a maximum transmission rank of its own size (S702).

The base station can select a code word used for precoding the physical channel after determining the number of ranks transmitted through each antenna. At this time, multi-code words or a single code word can be used in accordance with each physical channel (S703).

The physical channels transmitted from the base station can use their own antennas different from one another in the number. Namely, several physical channels transmitted from a single base station can use their own antennas different from one another in the number. If a large number of transmitting antennas (Tx) are provided, pilot symbol overhead may be high. Since there are no sufficient resources in a low frequency region, if a small number of antennas are provided, a data transmission rate can be increased. Also, since correlation among the transmitting antennas is high in the low frequency region, if K number of transmitting antennas having low correlation are selected from T number of transmitting antennas, the physical channels can be transmitted to maximum ranks. Also, if several RFs are transmitted from a single base station through different number of transmitting antennas, the physical channels can have an independent broadcasting channel (BCH) for each RF and can be transmitted through their own transmitting antennas different from one another in the number (S704).

Furthermore, the base station can use different pilot structures considering features for each physical channel. For example, the base station can use a pilot allocation structure having a different number of pilot allocations and different allocation locations depending on frequency features for each of physical channels of a high frequency band and a low frequency band (S705).

Furthermore, the base station can select the number of physical channels allocated to the mobile station in accordance with use and level of the mobile station (S706). Since a control channel for data transmission and reception requires high reliability, the base station can allocate the control channel to the low frequency band (S707).

As described above, the base station can optimize the system by allocating a physical channel in accordance with a frequency band using various features of the frequency band. The base station can perform the above steps S701 to S707 in due order. The order of the steps S701 to S707 can be changed in accordance with the channel status.

Hereinafter, each of the steps described with reference to FIG. 7 will be described in detail.

Method of Determining a Duplexing Mode

Figure 8:
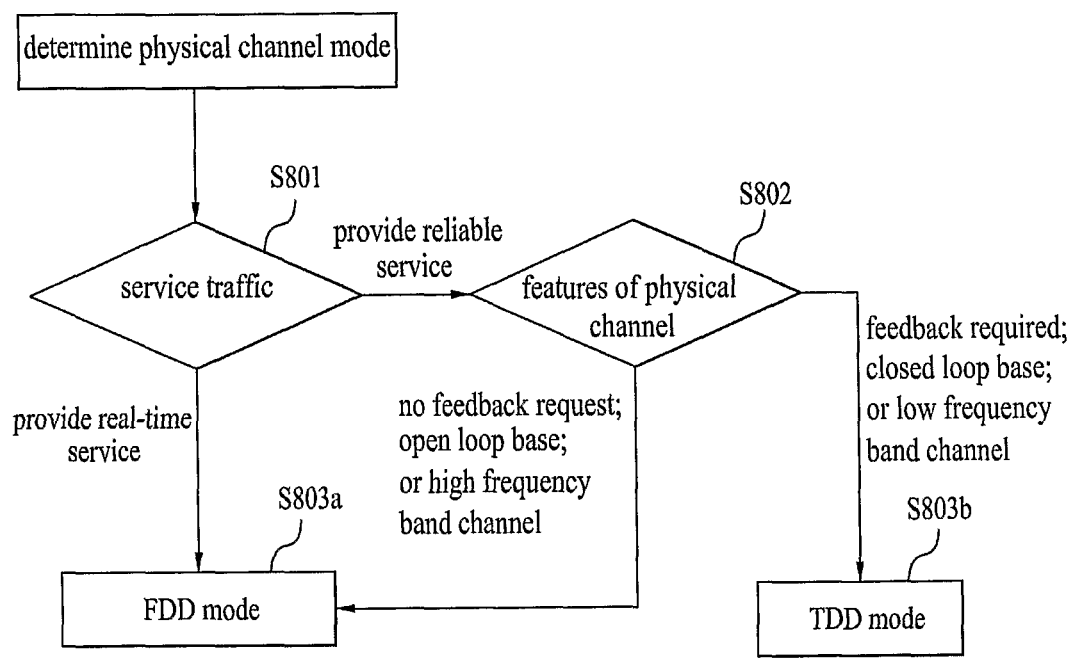
FIG. 8 is a diagram illustrating a method of determining a duplexing mode of a physical channel in accordance with one embodiment of the present invention.

FIG. 8 is a diagram illustrating a method of determining a duplexing mode of each physical channel in accordance with one embodiment of the present invention.

A communication system can be optimized in such a manner that several physical channels allocated to one mobile station use different duplexing modes in accordance with physical channels without using a single duplexing mode.

A frequency division duplexing (FDD) mode means that the UL and the DL respectively use different frequency bands. Since channel information cannot be obtained without feedback in the FDD mode, much feedback information is required. However, since the FDD supports a full duplexing mode, it is advantageous in that delay in data transmission does not occur.

The time division duplexing (TDD) mode is characterized in that the DL and the UL share temporal resources while using a single frequency band. Accordingly, since the UL and the DL have the same channel, received channel information can again be used during data transmission. However, in case of the TDD mode, since a downlink (DL) channel cannot be transmitted for an uplink transmitting period, delay in data transmission may occur. Also, since all frequency bands are used, data may be transmitted in burst.

Accordingly, the base station can use the FDD mode and the TDD mode together considering features of the physical channels and features of service traffic to be transmitted to the mobile station. Namely, a specific physical channel can use only the FDD mode or the TDD mode, and other physical channels can use the FDD mode and the TDD mode together.

Referring to FIG. 8, the base station can configure physical channels to have different duplexing modes in accordance with service traffic or a type of the service traffic (S801).

For example, in step S801, in voice communication and communication of a real time service type where time delay should relatively be small, the FDD mode is preferably used (S803a). In order to provide a reliable service that requires relatively exact DL/UL channel information and high data throughput, the TDD mode is preferably used.

However, to provide a reliable communication service, instead of directly using the TDD mode, it is possible to select what duplexing mode can be used for each channel based on the features of the physical channels (S802).

For example, a multi-antenna scheme can be varied depending on frequency band features of each physical channel. At this time, in a physical channel which uses a multi-antenna scheme of a singular value decomposition (SVD)-based beamforming type, wherein the multi-antenna scheme requires much feedback information, the TDD mode can be used to minimize feedback overhead (S803b). In a PHY channel which uses a multi-antenna scheme based on an open loop or limited feedback, the FDD mode can be used (S803a).

In step S802, motion speed of the mobile station can also be considered when considering features of the physical channel. The physical channels are affected differently depending on the motion speed of the mobile station. For example, the physical channel in the low frequency region has a feature robust to Doppler. Accordingly, among several physical channels, in a physical channel of a low frequency band having channel variation relatively lower than the motion speed, the TDD mode susceptible to channel variation is preferably used (S803b). In the physical channel of the high frequency band, the FDD mode is preferably used (S803a).

Although the method of FIG. 8 is preferably used in step S701 of FIG. 7, the method can be used independently as a method for optimizing the system in accordance with the features of the physical channels.

MTR Limit Scheme

Hereinafter, the MTR limit scheme for determining a maximum transmission rank (MTR) according to a physical channel will be described in detail. The MTR limit scheme can be used in step S702, and can be used independently from FIG. 7.

The multi-RF system can also be applied to a multi input multi output (MIMO) system. Even though a single base station transmits signals through a plurality of physical channels, each physical channel can have its own MIMO channel different from those of other physical channels.

For example, features of the MIMO channel can be varied depending on correlation between transmitting and receiving antennas. Accordingly, if the physical channels share a physical antenna, it is preferable to determine the number of data streams transmitted from each antenna considering correlation among the transmitting and receiving antennas in accordance with the features of each physical channel.

Supposing that the number of data streams spatially and simultaneously transmitted is rank in the embodiments of the present invention, the MTR may be small in the high frequency region having relatively high channel correlation. Accordingly, rank adaptation independent for each physical channel can be properly applied. Even though each physical channel uses the same number of transmitting receiving antennas, the number of MTRs can be defined differently for each physical channel.

The following Table 1 illustrates an example of the MTR limit scheme according to the features of the physical channels.

TABLE 1

| PHY channel number | MTR(4Tx, 4Rx) |
|---|---|
| PHY #1 (fc = around 400 MHz) | 1 |
| PHY #2 (fc = around 800 MHz) | 2 |
| ... | ... |
| PHY #M (fc = around 3500 MHz) | 4 |

Referring to Table 1, since the number of MTRs is varied depending on each of the physical channels, channel feedback can be varied depending on each antenna. In Table 1, in case of the first physical channel (PHY #1) where the center frequency (fc) is 400 MHz, approximately, since the first physical channel belongs to the low frequency region, correlation among antennas is relatively high in the multi-antenna system. Accordingly, in case of the first physical channel, a size of the MTR is preferably set to 1. Also, in case of the Mth physical channel (PHY #M), since the center frequency is 3500 MHz, correlation among antennas is relatively low in the multi-antenna system. Accordingly, in case of the Mth physical channel, the size of the MTR is preferably set to 4.

If it is not sure whether the center frequency (fc) of each antenna belongs to the low frequency region or the high frequency region, the MTR can be determined by additionally considering features of service traffic or other features of the physical channels as described with reference to FIG. 8.

Determination of MCW and SCW

Figure 9:
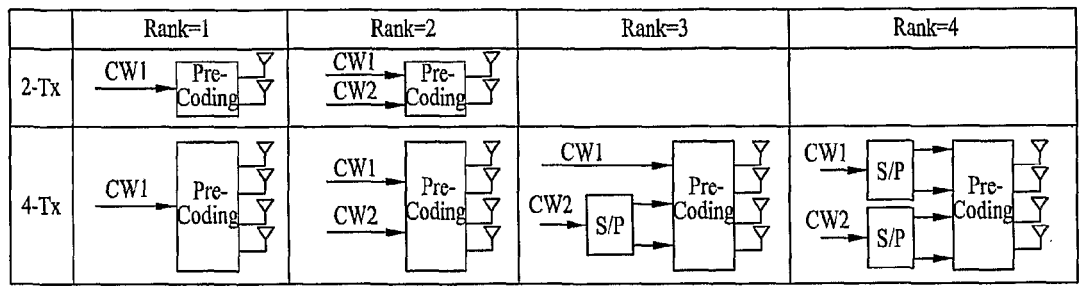
FIG. 9 is a diagram illustrating a method for selecting a code word considering features of physical channels in a MIMO system in accordance with one embodiment of the present invention.
Figure 9:
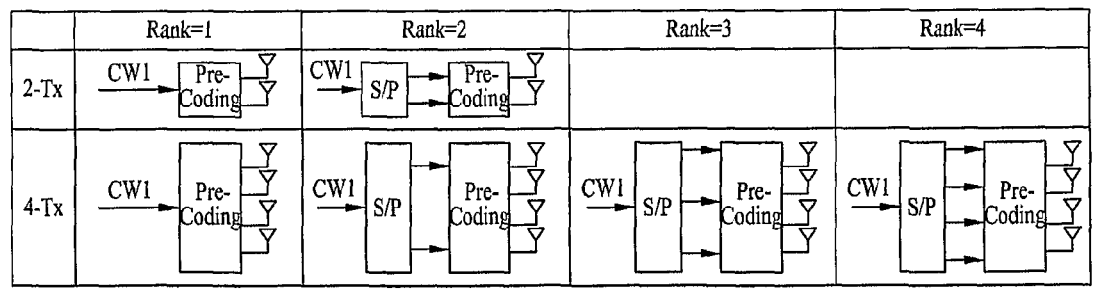

FIG. 9 is a diagram illustrating a method for selecting a code word considering features of physical channels in a MIMO system in accordance with one embodiment of the present invention.

Referring to Table 1, it is noted that physical channels having the same number of transmitting and receiving antennas can respectively have different MTRs. In this case, to minimize feedback overhead in accordance with the frequency band, a single code word (SCW) can be used despite that the number of MTRs is more than 2.

A multiple code word (MCW) and a SCW can be used independently depending on each physical channel. For example, FIG. 9 illustrates a MCW scheme where maximum two CWs are used and a SCW scheme where a single CW (SCW) is used regardless of rank. In this case, a multi-antenna transmission system of the MCW scheme of FIG. 9(a) is applied to a specific physical channel of a plurality of physical channels, and the SCW scheme of FIG. 9(b) is applied to the other physical channels.

FIG. 9(a) illustrates a method for mapping multiple code words (MCWs) with the physical channel, wherein two code words are used regardless of the MTR. FIG. 9(b) illustrates a method for mapping a single code word with the physical channels, wherein a single code word is used regardless of the MTR. Accordingly, two or one code word can be used even though the number of ranks is 1 or 4.

FIG. 9(a) and FIG. 9(b) illustrate that the same code word(s) is used regardless of the rank. However, in accordance with features of service traffic and physical channels provided from the base station, a single code word can be used when the rank is low (for example, rank=1 or 2) while multiple code words can be used when the rank is high (for example, rank=3 or 4). By contrast, a single code word may be used when the rank is high while multiple code words may be used when the rank is low. Also, different code words varied depending on each rank can be mapped to the physical channels.

The method of FIG. 9 is preferably used in step S703 of FIG. 7. However, the method can be used independently regardless of FIG. 7 in accordance with the user's requirements, the communication status or the channel status.

Selection of the Number of Transmitting Antennas According to Physical Channels

One or more physical channels transmitted from a single base station can use different number of antennas. At this time, if a lot of transmitting antennas are provided, since pilot symbols can be used for each antenna, high pilot symbol overhead may occur.

At this time, since there are not sufficient radio resources (for example, allocated bandwidth) in the physical channel of the low frequency region, it is preferable that a small number of transmitting antennas are used to increase a data transmission rate. Also, in case of the physical channel of the low frequency region, correlation of the transmitting antennas is high. Accordingly, if K number of transmitting antennas (or two antennas) are selected from T number of transmitting antennas (or four antennas), data can be transmitted with maximum rank. For example, if a plurality of antennas are used, the base station can reduce correlation among antennas by selecting the antennas spatially farthest away from one another.

Furthermore, if several RFs transmitted from a single base station use different number of transmitting antennas, each RF can have an independent broadcasting channel (BCH), and can use different number of transmitting antennas.

The method of determining the number of transmitting antennas according to the physical channels can be used in step S704 of FIG. 7. Also, the method of transmitting the number of transmitting antennas in accordance with the features of the physical channels can be used independently from the method of FIG. 7.

Reference Signal Structures

Figure 10:
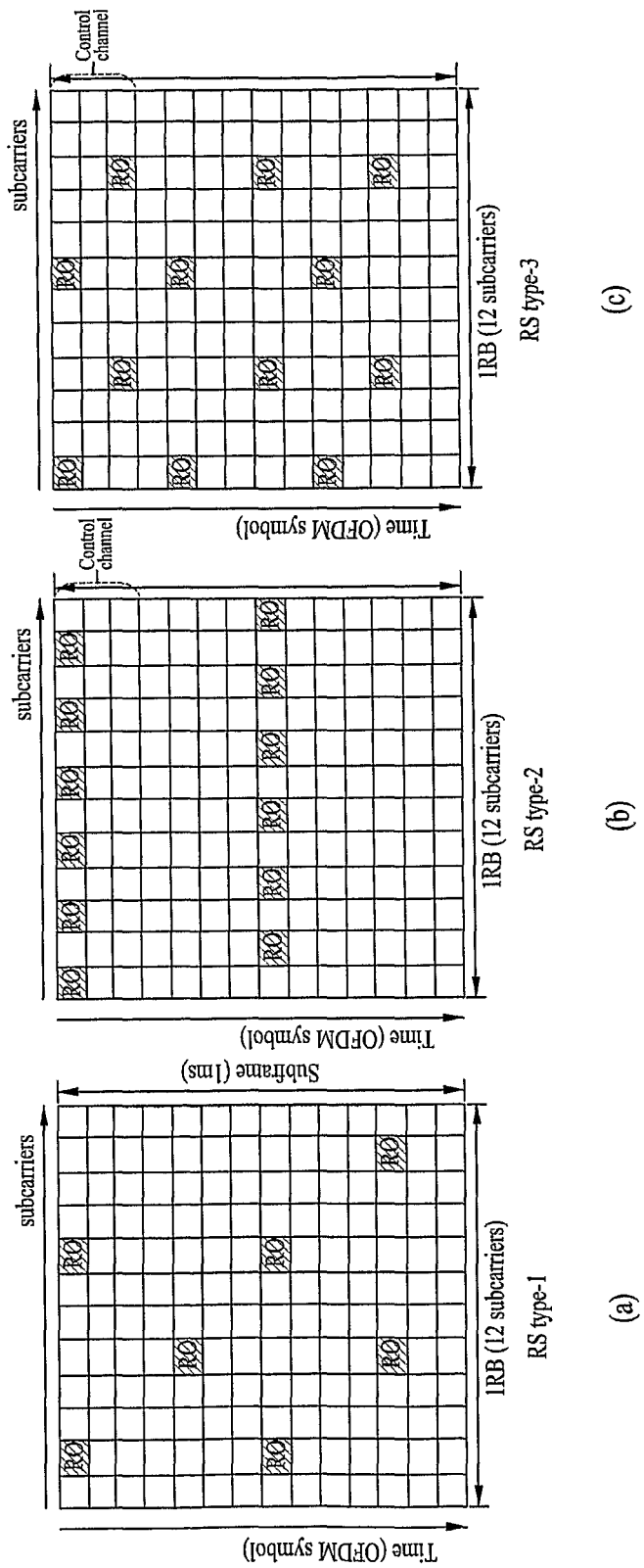
FIG. 10 is a diagram illustrating examples of reference signal structures depending on features of physical channels in accordance with one embodiment of the present invention.

FIG. 10 is a diagram illustrating examples of reference signal structures depending on features of physical channels in accordance with one embodiment of the present invention.

Interference affected among the physical channels can be varied depending on frequency features of each physical channel and motion speed of the mobile station. Accordingly, the base station and the mobile station can use a reference signal (RS) allocation structure varied depending on each physical channel. Also, the base station and the mobile station generate a plurality of reference signal (or pilot signal) allocation structures for the number of transmitting antennas allocated to the physical channels and then use different types of reference signal allocation structures depending on the channel status or the physical channels.

The reference signal allocation structures of FIG. 10 can be used fixedly, or can be varied at a given time interval. If the reference signal structures are varied at a given time interval, it is preferable that the base station notifies the mobile station of information of the varied reference signal structures whenever the reference signal structures are varied.

FIG. 10 illustrates three RS structures as examples of the reference signals that can be used in the embodiments of the present invention. At this time, FIG. 10($a$) illustrates a first RS type structure (RS type-1) wherein reference signals are equally allocated to a frequency region and a time region.

FIG. 10($b$) illustrates a second RS type structure (RS type-2), wherein relatively more reference signals are allocated to the frequency region than the time region. Also, FIG. 10($c$) illustrates a third RS type structure (RS type-3), wherein relatively more reference signals are allocated to the time region than the frequency region. The base station can selectively use the reference signal types of FIG. 10 in accordance with the status and notify the mobile station of the selected reference signal type.

The physical channel of the low frequency band has relatively high frequency selectivity and is robust to channel variation according to motion speed. Accordingly, the base station can optimize channel estimation throughput by allocating relatively more reference signals to the frequency region and allocating relatively less reference signals to the time region. For example, the base station can apply the pilot symbol structure of FIG. 10($b$) to the physical channel of the low frequency region having relatively high frequency selectivity.

The physical channel of the high frequency band has relatively low frequency selectivity and is susceptible to channel variation according to motion speed. Accordingly, the base station can optimize channel estimation throughput by allocating relatively more reference signals to the time region in a specific resource block and allocating relatively less reference signals to the frequency region. For example, the base station can use the reference signals more allocated to the time region for a specific physical channel when providing a real-time service, thereby maintaining high channel estimation throughput even under the high-speed mobile environment.

In FIG. 10, the base station can use a dedicated reference signal for a physical channel which uses the TDD mode. In this case, the base station can minimize overhead of a control channel and also reduce overhead caused by the reference signals. Also, the base station can use common reference signals for the physical channel which uses the FDD mode, thereby facilitating feedback of channel status information.

The allocation structures of the reference signals in FIG. 10 are described to facilitate technical spirits of the present invention, and various modifications can be made therein. Namely, the reference signal structure can be varied depending on the features of the physical channels. For example, the TDD mode can be used in the physical channel of the low frequency region. At this time, relatively more reference signals can be allocated to the frequency region, whereby the optimized communication system can be configured. Also, the FDD mode can be in the physical channel of the high frequency region. At this time, relatively more reference signals can be allocated to the time region, whereby the optimized communication system can be configured.

The method of FIG. 10 can be used in step S705 of FIG. 7, and can be used when the base station configures the physical channels independently from FIG. 7.

Figure 11:
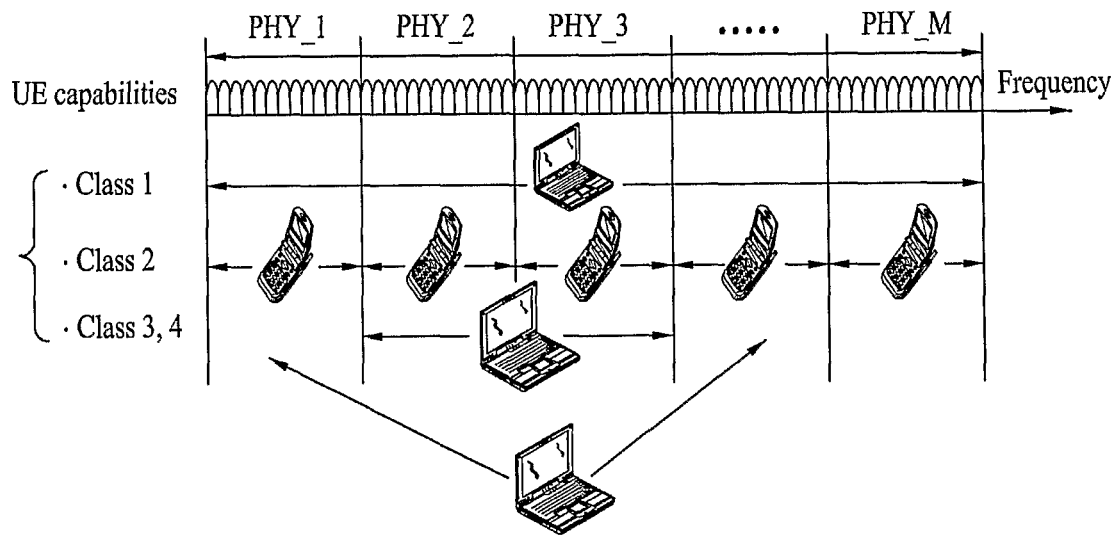
FIG. 11 is a diagram illustrating one of methods of determining the number of physical channels depending on use or level of a mobile station, in accordance with one embodiment of the present invention.

Method of Determining the Number of Physical Channels According to Level of Mobile Station FIG. 11 is a diagram illustrating one of methods of determining the number of physical channels depending on use or level of a mobile station, in accordance with one embodiment of the present invention.

If a plurality of physical channels are received in a system where one or more physical channels exist, complexity may increase. At this time, the maximum number of physical channels that can be received in each mobile station can be defined in accordance with use and level of the mobile station (UE class). Also, levels of the mobile stations can be classified in such a manner that level of the mobile station that can simultaneously use contiguous physical channels only and level of the mobile station that can simultaneously use non-contiguous physical channels are defined.

Referring to FIG. 11, the RF system to which the embodiments of the present invention are applied can use M number of physical channels. At this time, the mobile station belonging to the first level (Class 1) can use all physical channels of all frequency bands, the mobile station belonging to the second level (Class 2) can use only one physical channel, and the mobile station belonging to the third level (Class 3) can use only the second physical channel (PHY_2) and the third physical channel (PHY_3). Also, the mobile station belonging to the fourth level (Class 4) can use only the first physical channel (PHY_1) and other physical channel (PHY_N) which is not contiguous to the first physical channel.

Furthermore, in the embodiments of the present invention, level of a specific mobile station can be configured to support only one of the FDD mode, the TDD mode and other duplexing modes to lower complexity of the system. Accordingly, the mobile station can use a physical channel operated in a corresponding duplexing mode among several physical channels. Also, the mobile station may use a plurality of physical channels or only one physical channel.

Level of a specific mobile station can be configured to receive only a specific physical channel. In this case, the specific physical channel may be a physical channel that includes a multicasting broadcasting service (MBS), or a physical channel that supports voice over IP (VoIP).

Figure 12:
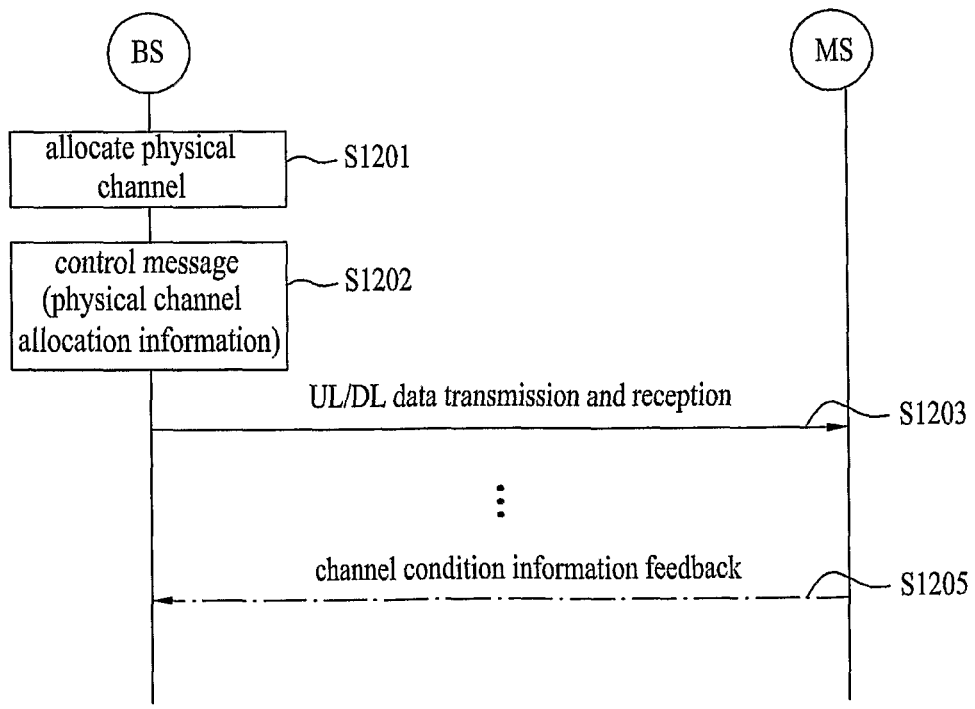
FIG. 12 is a diagram illustrating a method for allocating each of optimized physical channels using a control message in accordance with one embodiment of the present invention.

FIG. 12 is a diagram illustrating a method for allocating each of optimized physical channels using a control message in accordance with one embodiment of the present invention.

Referring to FIG. 12, the base station can generate physical channels and optimize each physical channel. Namely, the base station can improve system throughput by optimizing the physical channels in accordance with the frequency band of each physical channel or cooperation between the respective physical channels. Accordingly, the base station can allocate the physical channels using the aforementioned methods described in FIG. 7 to FIG. 11 (S1201).

The base station can transmit information of the physical channels allocated in step S1201 to the mobile station through the control message (S1202).

At this time, as illustrated in FIG. 7 to FIG. 11, examples of physical channel allocation information transmitted from the base station to the mobile station in step S1202 can include physical channel mode information according to the features of the physical channel, rank information for each frequency band to which each physical channel is allocated when the MTR limit scheme is used, code word information selected in accordance with the features of the physical channels, information of the number of antennas allocated in accordance with frequency features of each physical channel, reference signal allocation structure information for each physical channel, and information of the number of physical channels allocated in accordance with level of the mobile station.

The base station and the mobile station can transmit and receive downlink data and uplink data using the physical channels allocated through the control message (S1203).

In FIG. 12, various control signals can be used as the control message used in step S1202. In the embodiments of the present invention, a physical downlink control channel (PDCCH) or a physical uplink control channel (PUCCH) can be used.

Hereinafter, a method of signaling control signals for multi-physical channel will be described in detail.

Downlink Control Signaling

Figure 13:
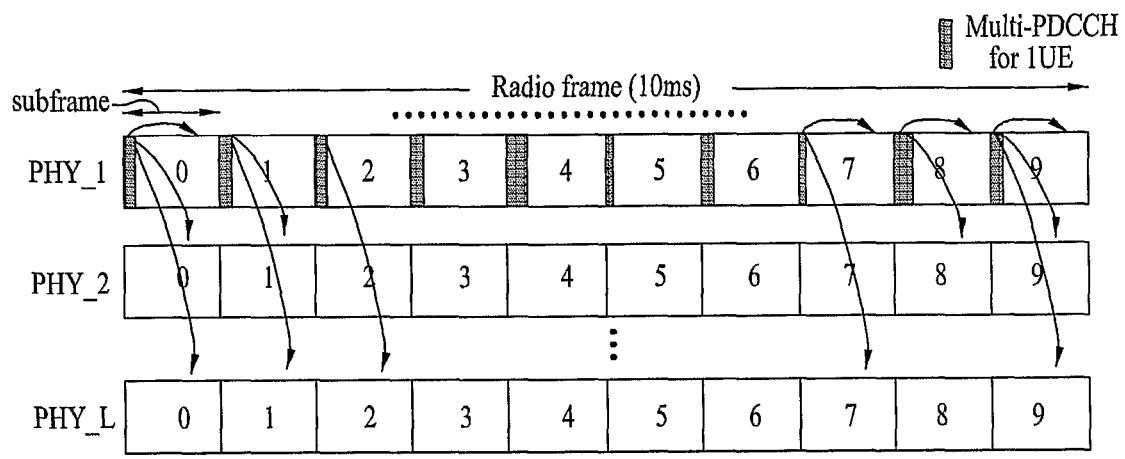
FIG. 13 is a diagram illustrating a method for transmitting multi-PDCCHs through physical channels in accordance with one embodiment of the present invention.

FIG. 13 is a diagram illustrating a method for transmitting a multi-PDCCH through physical channels in accordance with one embodiment of the present invention.

A PDCCH for notifying information of downlink data transmission can use a plurality of physical channels. However, the base station should notify the mobile station of the number of physical channels used by the PDCCH. At this time, the base station can notify the mobile station of the plurality of PDCCHs allocated to the plurality of physical (PHY) channels in accordance with various types as illustrated in FIG. 6.

Referring to FIG. 6, the first type and the second type mean that control information of several downlinks can be transmitted simultaneously. Hereinafter, a method of configuring and transmitting a multi-PDCCH to transmit a control channel as illustrated in FIG. 6 will be described. In the embodiments of the present invention, a group of a plurality of PDCCHs for downlink will be referred to as a multi-PDCCH, and a group of a plurality of PUCCHs for uplink will be referred to as a multi-PUCCH.

A method of configuring a multi-PDCCH can be divided into a joint coding method and a separate coding method.

In configuring the multi-PDCCH, the base station can perform joint coding by channel-coding downlink data information of all physical channels. At this time, since one centralized PDCCH has information of every downlink data transmission, the mobile station should receive the centralized PDCCH to receive downlink data transmitted from the plurality of physical channels.

If the mobile station receives the multi-PDCCH generated using joint coding, the mobile station can obtain every downlink data information of a plurality of physical channels through one channel decoding.

The base station can transmit various kinds of PDCCH information to the mobile station using separate coding. The base station can configure the multi-PDCCH using separate coding. For example, the base station can configure the multi-PDCCH by coding PDCCH of each physical channel and packing each of coded PDCCHs. Namely, the base station can transmit the multi-PDCCH to the mobile station through a specific resource region by coding each of the PDCCHs and grouping the coded PDCCHs.

The multi-PDCCH aggregated using joint coding or separate coding in the base station can be transmitted to the mobile station through a PDCCH channel region of one or more physical channels.

The multi-PDCCH can be transmitted in accordance with the first type or the second type of FIG. 6. Accordingly, it is preferable that the respective PDCCHs included in the multi-PDCCH have the same coding rate. However, cyclic redundancy check (CRC) for error checking may be applied to each PDCCH or only the multi-PDCCH. Otherwise, CRC for error checking may be applied to all of the multi-PDCCH after being applied to each PDCCH.

At this time, if CRC is applied to each PDCCH and the multi-PDCCH, its length can be varied depending on the PDCCHs. Also, to configure the multi-PDCCH using a plurality of PDCCHs, indication as to what physical channel is indicated by each PDCCH is required. To this end, a CRC masking scheme of a specific pattern can be applied to each PDCCH.

Accordingly, if each PDCCH includes CRC, it is possible to identify whether a corresponding PDCCH is for what physical channel using a CRC masking pattern. FIG. 13 is a diagram illustrating a method of applying a multi-PDCCH using the second type of FIG. 6.

The multi-PDCCH may be transmitted through only a specific physical channel as illustrated in the first type of FIG. 6 or several physical channels. If the multi-PDCCH is transmitted in accordance with the first type, the multi-PDCCH can be hopped by a specific pattern defined among a plurality of physical channels to maximize diversity gain of the physical channels. In this way, if hopping is used, diversity gain of the physical channels can be obtained.

Furthermore, the first type and the second type can be used adaptively in accordance with the channel status. For example, the mobile station which is under the mobile environment of high speed has difficulty in identifying which physical channel has a good status. Accordingly, the mobile station of high speed can acquire channel diversity gain by transmitting the multi-PDCCH using a plurality of physical channels.

The mobile station which is under the mobile environment of low speed can identify which physical channel has a good status in accordance with time. In this case, it is preferable that the base station notifies the mobile station of information of a physical channel that transmits the multi-PDCCH.

Figure 14:
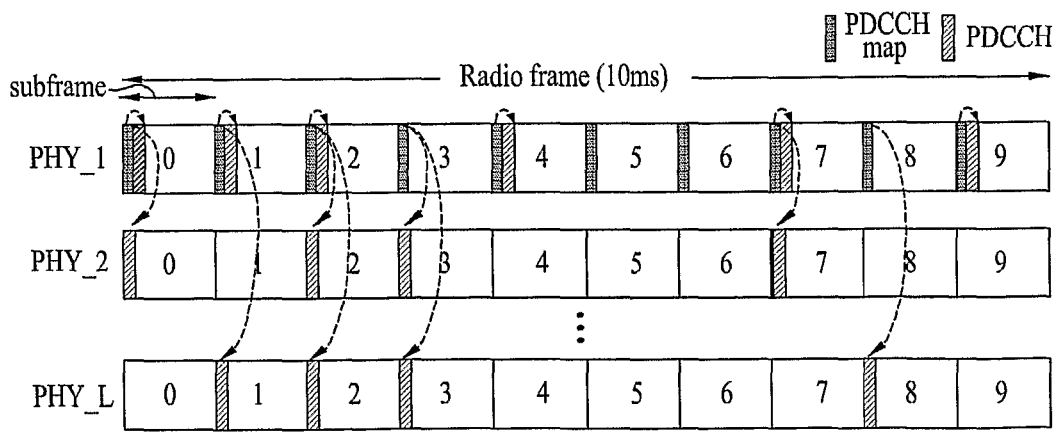
FIG. 14 is a diagram illustrating a layered PDCCH structure in accordance with one embodiment of the present invention.

FIG. 14 is a diagram illustrating a layered PDCCH structure in accordance with one embodiment of the present invention.

In FIG. 14, it is assumed that the PDCCHs are transmitted in accordance with the third type of FIG. 6. If the base station transmits the PDCCHs in accordance with the third type of FIG. 6, the mobile station performs blind detection several tens of times to receive a corresponding PDCCH in each of the physical channels. The blind detection has problems in that power consumption of the mobile station increases and complexity of the receiver increases.

Accordingly, in order to solve the above problems, the base station can use a method of transmitting a PDCCH map to a mobile station through a previously defined channel, wherein the PDCCH map serves to notify the mobile station of PDCCH position of each physical channel or notify whether PDCCH of the corresponding mobile station has been allocated to each physical channel.

As described above, the mobile station can reduce complexity of the receiver by reducing or eliminating the number of times of blind detection using the received PDCCH map. Also, the mobile station can reduce unnecessary power consumption in the above procedure. However, the PDCCH map should be configured to have strong reliability. Accordingly, it is preferable that the PDCCH map is transmitted to the mobile station through a specific physical channel as illustrated in FIG. 14.

For example, the base station can transmit the PDCCH map through the first physical channel (PHY_1). However, the base station can fixedly use the first physical channel to transmit the PDCCH map, and can change the physical channel at a given time interval in accordance with the channel status.

The frequency band to which a plurality of physical channels are allocated can be varied depending on level of the mobile station (UE class). At this time, the PDCCH map can be transmitted using the lowest frequency band. This is because that reliability of the low frequency band is the highest.

However, the physical channel that transmits the PDCCH map can be changed depending on time. Also, the PDCCH map may be transmitted from a plurality of physical channels by a given hopping pattern, or may be transmitted to a plurality of physical channels by being separated thereto.

If the PDCCH is not transmitted to all physical channels, the base station may transmit the PDCCH map to the mobile station to notify the presence of the PDCCH, or may not transmit the PDCCH map to the mobile station to allow the mobile station to recognize that an error has occurred.

Uplink Feedback Channel

If a plurality of downlink physical channels are allocated to one mobile station, the mobile station can adaptively optimize the system by feeding channel status information of each physical channel back to the base station.

The following Table 2 illustrates examples of CQI and PMI feedback type modes for a physical uplink shared channel (PUSCH) report mode.

TABLE 2

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

Table 2 illustrates channel status information feedback modes using an uplink data channel of the 3GPP LTE system which is one of the wireless access systems. Referring to Table 2, granularity of a frequency region of a precoding matrix index (PMI) and a channel quality indicator (CQI) can be divided into several types in accordance with each channel status information feedback mode.

For example, mode 2-0 represents that PMI is not used and feedback PUSCH CQI type is subband CQI selected by the mobile station, and mode 3-0 represents that PMI is not used and feedback PUSCH CQI type is subband CQI configured in an upper layer. Also, mode 3-1 represents that feedback PUSCH CQI type is subband CQI configured in an upper layer in case of a single PMI. Furthermore, mode 1-2 represents that feedback PUSCH CQI type is broadband CQI in case of multi-PMIs, and mode 2-2 represents that multi-PMIs are used when feedback PUSCH CQI type is subband CQI selected by the mobile station.

Feedback overhead and system throughput are varied depending on each status information feedback mode. Accordingly, the system can be optimized by using channel status information feedback mode suitable for motion speed of the mobile station and multi-antenna channel status. In Table 2, a method of feeding channel status information back in accordance with a request of the base station is generally used.

The following Table 3 illustrates examples of CQI and PMI feedback type modes for a PUCCH report mode.

TABLE 3

| | | PMI Feedback Type | |
|---|---|---|---|
| | | No PMI | Single PMI |
| PUCCH CQI Feedback Type | Wideband (Wideband CQI) | Mode 1-0 | Mode 1-1 |
| | UE Selected (Subband CQI) | Mode 2-0 | Mode 2-1 |

In each feedback mode of Table 3, periodic channel status information feedback is mainly used, and is transmitted through a control channel. If a specific system uses a single carrier frequency-division multiple access (SC-FDMA) for an uplink, a PUCCH report mode and uplink data transmission cannot be performed simultaneously. In this case, the PUCCH report mode is preferably transmitted through a data channel.

Referring to Table 3, mode 1-0 represents broadband CQI where PMI is not used, and mode 1-1 represents broadband CQI where single PMI is used. Also, mode 2-0 represents subband CQI selected by the mobile station, wherein PMI is not used, and mode 2-1 represents subband CQI selected by the mobile station, wherein single PMI is used.

Synchronous Channel Status Information Feedback Between Physical Channels

Figure 15:
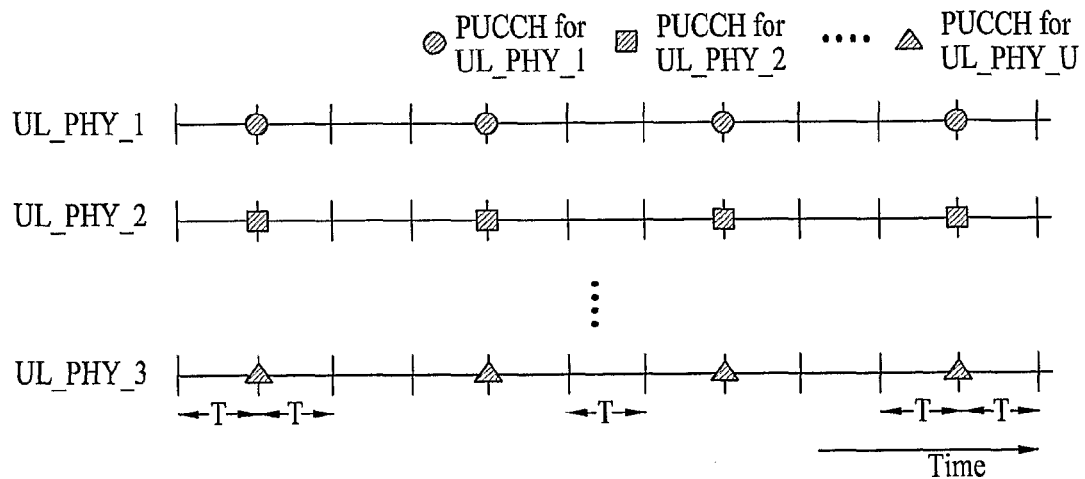
FIG. 15 is a diagram illustrating a case where PUCCH report periods of all uplinks are synchronized in accordance with one embodiment of the present invention.

FIG. 15 is a diagram illustrating a case where PUCCH report periods of all uplinks are synchronized in accordance with one embodiment of the present invention.

If periodic channel status feedback of Table 3 is used, the mobile station can perform periodic PUCCH report using one of two types. One of the types is that PUCCH report periods of all uplink channels are equally used. The other one is that the uplink physical channels are designed to have multiple periods with respect to one another, thereby enabling efficient channel status feedback.

If the PUCCH report periods of all uplinks are synchronized as illustrated in FIG. 15, a plurality of PUCCHs can be grouped to generate a multi-PUCCH, and the multi-PUCCH can be transmitted in accordance with one of the types suggested in the downlink according to the present invention. In this case, since all uplink physical channels have the same period, the multi-PUCCH can be transmitted to a specific uplink physical channel per feedback time.

Figure 16:
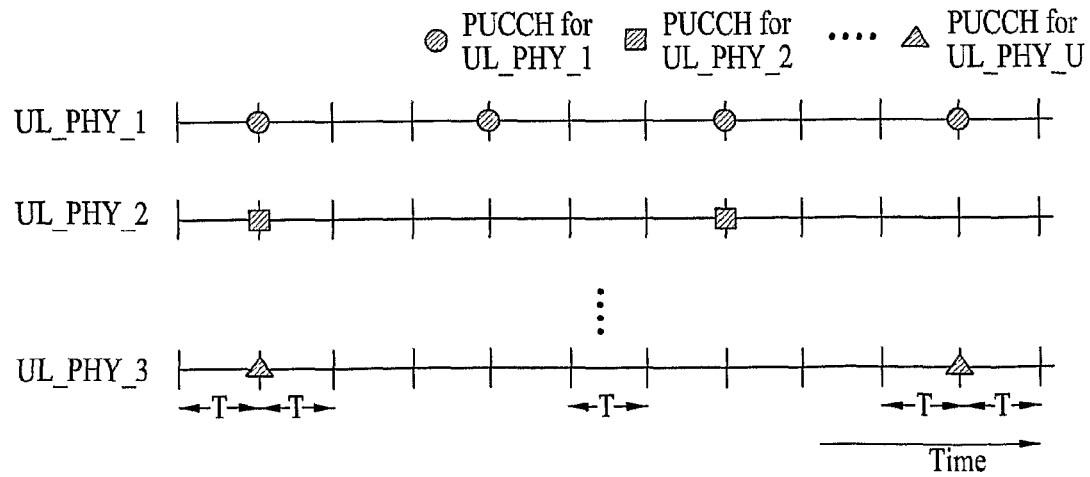
FIG. 16 is a diagram illustrating an example of a period of each uplink physical channel configured in a type of multiple (or non-periodical type) in accordance with one embodiment of the present invention.

FIG. 16 is a diagram illustrating an example of a period of each uplink physical channel configured in a type of multiple (or non-periodical type) in accordance with one embodiment of the present invention.

If the number of uplink physical channels is symmetrical to that of downlink physical channels in PUSCH report non-periodically fed back as illustrated in FIG. 16, it is preferable that multi-PUSCH is not configured. However, overhead applied to the mobile station may be high in case of the PUSCH report, the multi-PUSCH can be configured and then transmitted to only a specific uplink physical channel.

If a plurality of uplink physical channels exist, only one uplink physical channel can be used for the PUCCH report. At this time, if the mobile station simultaneously transmits a plurality of periodic PUCCH reports for a plurality of downlink physical channels to the base station, the mobile station may transmit one PUCCH at a time in accordance with the order. In this case, PUCCH for the plurality of downlink physical channels can be configured to be transmitted in a type of circular repetition.

When the base station transmits the multi-PUCCH, capacity of the existing PUCCH may be insufficient. In this case, the base station can transmit the multi-PUCCH through an uplink data channel, i.e., PUSCH (physical uplink shared channel). At this time, the base station may transmit the multi-PUCCH and data together, or may transmit the multi-PUCCH only.

The base station may transmit the multi-PUCCH configured by grouping a plurality of PUCCHs through only a specific uplink physical channel. Also, the base station may transmit the multi-PUCCH by selecting a specific uplink physical channel in accordance with time. Also, the base station may transmit the multi-PUCCH by applying a previously defined hopping pattern to the multi-PUCCH, thereby maximizing diversity gain among the physical channels.

Hereinafter, if a frequency division multiplexing method is used, a method for allocating downlink and uplink physical channels asymmetrically will be described.

Asymmetrical Allocation of UL/DL FDD

Hereinafter, a downlink physical channel will be referred to as DL_PHY, and an uplink physical channel will be referred to as UL_PHY. At this time, if one mobile station uses D number of DL_PHYs and U number of UL_PHYs and D=U is not satisfied, it may be regarded that the uplink and the downlink always have an asymmetric structure (see FIG. 5).

If a specific frame has an asymmetric structure, a problem may occur in that the mobile station and the base station transmit and receive various kinds of control information to and from each other. Accordingly, in the following embodiments of the present invention, a method of increasing a capacity of a control channel when an uplink and a downlink of a system which supports multi-RFs have an asymmetrical structure will be described.

(1) Downlink Control Signaling

A PHICH (Physical Hybrid automatic repeat request Indicator CHannel) bundling scheme can be used for downlink control signaling. The PHICH bundling scheme is as follows.

In case of an asymmetrical structure of D<U type, a proper HARQ process should be performed for a plurality of UL_PHY channels using a small number of DL_PHY channels. Accordingly, it is preferable that a physical HARQ indicator channel (PHICH) which is ACK/NACK channel of uplink data transmission has a capacity more increased than that of a symmetric structure. However, a problem occurs in that it is not easy to increase the capacity of the PHICH.

Accordingly, to effectively solve the problem, a method of transmitting ACK/NACK signals to one PHICH can be considered. At this time, if a NACK signal occurs in the receiver, the transmitter can recognize that an error has occurred in one or more UL_PHY channels among a plurality of UL_PHY channels. Namely, the transmitter can retransmit all UL_PHY channels.

However, a problem may occur in that data of all UL_PHY channels should be retransmitted even though an error has occurred in one UL_PHY channel. Accordingly, this problem can be solved using one PHICH and one PDCCH.

For example, the PHICH can indicate the presence of the error occurring in the plurality of UL_PHY channels, and a specific PDCCH can indicate whether an error has occurred in a specific UL_PHY channel. In this way, the transmitter can effectively control the HARQ process of the plurality of UL_PHY channel using a small number DL_PHY channels.

In case of an asymmetrical structure of D>U type, indication as to whether a PHICH of a small number of UL_PHY channels should be transmitted through which one of a plurality of DL_PHY channels is required. To this end, the PHICH for each UL_PHY channel can be mapped with D number of DL_PHY channels 1:1. Alternatively, a plurality of PHICHs may be allocated to a specific DL_PHY channel.

A scheduling grant indication field can be used for downlink control signaling.

In case of D<U or D>U, indication as to what DL_PHY channel a PDCCH for scheduling grant for each UL_PHY channel is transmitted through is required. In this case, if a plurality of UE_IDs are allocated to one mobile station and CRC masking is performed for PDCCH for scheduling grant to receive scheduling grant using specific UE_ID, since the corresponding UE_ID indicates a specific UL_PHY channel, the indication can be performed.

Additionally, if a scheduling grant PDCCH having a plurality of UE_IDs for one mobile station is transmitted through one DL_PHY channel, since a scheduling grant PDCCH for a plurality of UL_PHY channel can be transmitted through one DL_PHY channel in case of D<U, resource allocation can be performed even though the PDCCH is configured based on blind detection.

(2) Uplink Feedback Channel

The transmitter can use an ACK/NACK bundling scheme for an uplink feedback channel. Hereinafter, the ACK/NACK bundling scheme will be described.

In order to transmit ACK/NACK information of a plurality of DL_PHY channels through the relatively small number of UL_PHY channels, a plurality of ACK/NACK channels should be transmitted. However, since it is not easy to increase the existing ACK/NACK channel capacity, a plurality of ACK/NACK information can be configured to be transmitted through the PUSCH.

Furthermore, the transmitter and the receiver use the ACK/NACK channel in accordance with the existing method. The ACK/NACK information can indicate that an error has occurred in one or more DL_PHY channels of a plurality of DL_PHY channels, and also can indicate the one or more DL_PHY channels in which the error has occurred through next subframe or PUSCH. Also, the transmitter and the receiver can use a plurality of ACK/NACK channels by receiving them in due order.

Multi-PUCCH transmission for the uplink feedback channel will be described as follows.

In case of D>U, the transmitter or the receiver generates a multi-PUCCH by grouping PUCCHs for a plurality of DL_PHY channels through a specific UL_PHY channel and then transmits the generated multi-PUCCH. The transmitter or the receiver can transmit a PUCCH for one DL_PHY channel through another UL_PHY channel.

For example, if five DL_PHY channels (DL_PHY_i, i=1, 2, . . . , 5) and three UL_PHY channels (UL_PHY_u, u=1, 2, 3) are allocated to one mobile station, the UL_PHY 1 transmits a multi-PUCCH by grouping PUCCHs for DL_PHY_1, DL_PHY_2, and DL_PHY_3, the UL_PHY_2 transmits a PUCCH for DL_PHY_4, and the UL_PHY_3 transmits a PUCCH for DL_PHY_5.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

What is claimed is:

1. A method for receiving downlink data in a wireless access system which supports multi-radio frequency bands, the method comprising: receiving, by a user equipment (UE) from a base station (BS), a physical downlink control channel (PDCCH) on a primary frequency band, the PDCCH including: control information associated with a scheduled frequency band on which the downlink data is to be transmitted; and
   an indication indicating the scheduled frequency band among the multi-radio frequency bands, the multi-radio frequency bands comprising a plurality of PDCCHs indicating which physical channel is indicated by each PDCCH; and receiving, by the UE from the BS, the downlink data through the scheduled frequency band that is indicated by the indication and is included in the multi-radio frequency band, wherein: if the downlink data is a voice over internet protocol (VoIP) data, the scheduled frequency band is only the primary frequency band, and
   if the downlink data is not a VoIP data, the downlink data is received through the scheduled frequency band indicated by the indication, wherein each of frequency bands included in the multi-radio frequency band has a center frequency, and wherein each of the frequency bands is configured with plurality of physical channels.

2. The method according to claim 1, wherein a maximum number of the frequency band which is allocated to the UE is determined according to a level of the UE.

3. The method according to claim 2, wherein the level of the UE is classified by ability of the UE that controlling a number of frequency bands simultaneously.

4. The method according to claim 1, wherein the primary frequency band and the scheduled frequency band are component carriers.

5. The method according to claim 1, further comprising transmitting a physical uplink control channel (PUCCH) comprising control information only on the primary frequency band.

6. An user equipment (UE) for receiving downlink data in a wireless access system which supports multi-radio frequency bands, the UE comprising:
   a processor for supporting the reception of the downlink data through the multi-radio frequency band; and reception antennas, wherein the processor is configured to: receive, from a base station (BS), a physical downlink control channel (PDCCH) only on a primary frequency band by using the reception antennas, the PDCCH including: control information associated with a scheduled frequency band on which the downlink data is transmitted; and an indication indicating the scheduled frequency band among the multi-radio frequency bands, the multi-radio frequency bands comprising a plurality of PDCCHs indicating which physical channel is indicated by each PDCCH, and receive, from the BS, voice over internet protocol (VoIP) the downlink data through the scheduled frequency band that is indicated by the indication and is included in the multi-radio frequency band by using the reception antennas, wherein:
   if the downlink data is a voice over internet protocol (VoIP) data, the scheduled frequency band is only the primary frequency band, and if the downlink data is not a VoIP data, the downlink data is received through the scheduled frequency band indicated by the indication,
   wherein each of frequency bands included in the multi-radio frequency band has a center frequency, and wherein each of the frequency bands is configured with plurality of physical channels.

7. The user equipment according to claim 6, wherein a maximum number of the frequency band which is allocated to the UE is determined according to a level of the UE.

8. The user equipment according to claim 7, wherein the level of the UE is classified by an ability of the UE to control a number of frequency bands simultaneously.

9. The user equipment according to claim 6, wherein the primary frequency band and the scheduled frequency band are component carriers.

10. The user equipment according to claim 6, wherein the UE is further configured to transmit a physical uplink control channel (PUCCH) comprising control information only on the primary frequency band.

11. The user equipment according to claim 6, wherein the processor is further configured to receive location information indicating the primary frequency band among the multi-radio frequency bands, by using the reception antennas.

12. The method according to claim 1, further comprising receiving, by the UE from the BS, location information indicating the primary frequency band among the multi-radio frequency bands.

* * * * *